Patented June 22, 1954

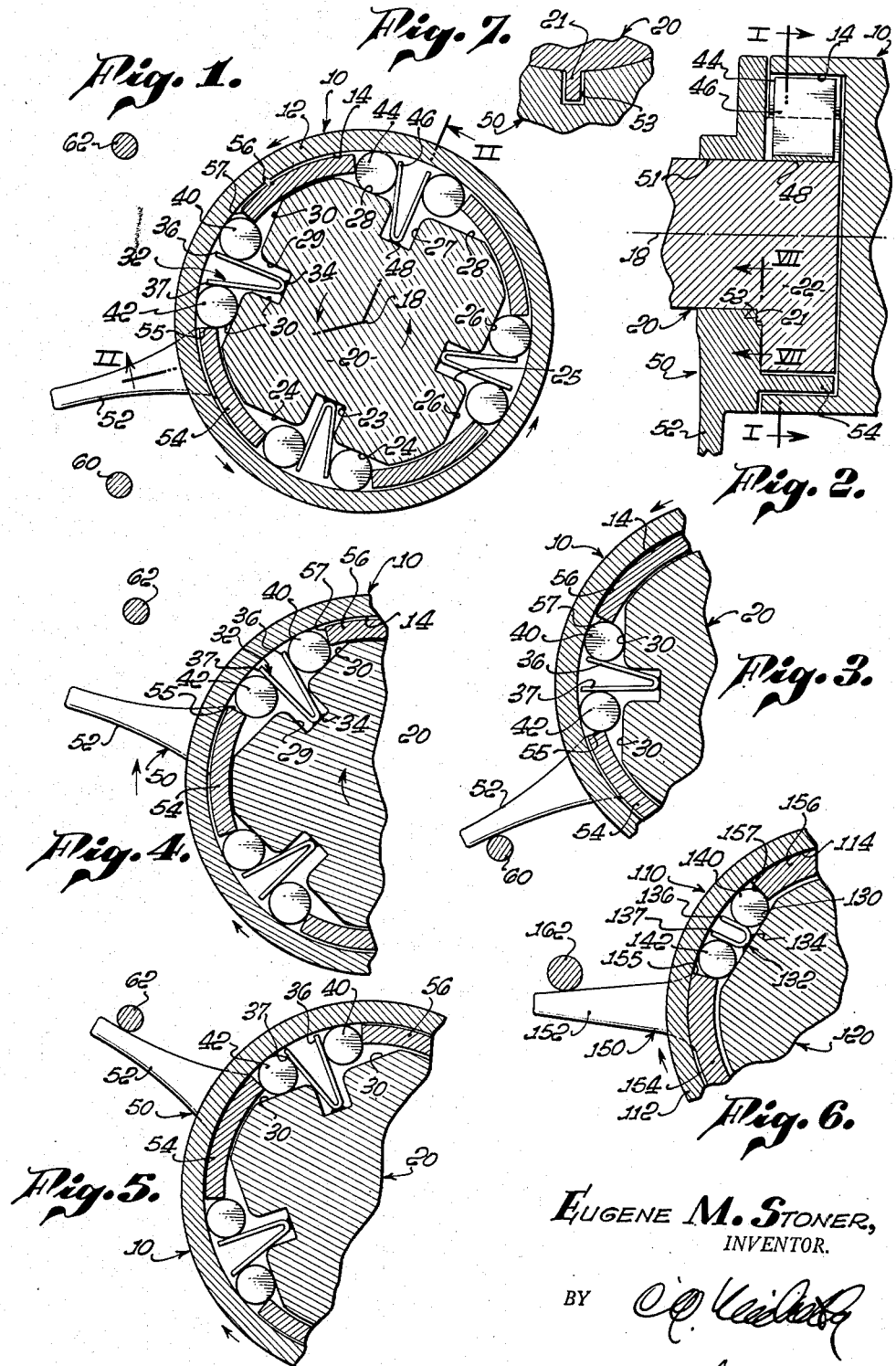

2,681,718

UNITED STATES PATENT OFFICE 2,681,718

BIDIRECTIONAL OVERRUNNING CLUTCH

Eugene M. Stoner, Los Angeles, Calif., assignor to Protair Corporation, Los Angeles, Calif., a corporation of California Application February 8, 1952, Serial No. 270,601

6 Claims. (Cl. 192—139)

This invention relates to a bidirectional overrunning clutch and, more particularly, to such a device having release means which are externally actuated to disengage the driving from the driven member.

In many industrial apparatuses it is desirable to cause a rapid movement of a driven member through a predetermined rotational angle, and to stop the movement of the driven member with extreme accuracy. An illustration is a valve in a pipeline or conduit carrying fluid under pressure where the opening or closing of the valve is accomplished by rotation of an actuating member through an angle of, say, 90°. When fluid in such a conduit is inflammable as in the case of the fuel system of a vehicle, it is of crucial importance to be able to close off the supply of fluid with utmost speed in case of an emergency. This would be true, for instance, in order to isolate the fuel supply of an aircraft from a fire existing in an engine.

Power actuated means for opening or closing a valve in such an apparatus normally includes an electric driving motor and a set of gears whereby the rotational speed of the motor is stepped down before connection to the valve closing mechanism proper. A motor of this type is designed to attain full speed within a very short period of time after electrical power is applied to it, and when the valve has been moved to its closed position it is necessary to disengage the driving motor from the valve closing mechanism or, alternatively, to absorb the rotational inertia of the motor and associated gearing by bringing the motor to a halt. The latter alternative is highly impractical from the standpoint of wear and strain imposed upon the step down gearing mechanism connecting the motor with the valve closing mechanism.

A similar problem arises when it is desired to open the valve. The motor is caused to rotate in the opposite direction and again it is desired to automatically disengage the motor and its associated gear train from the valve mechanism at, or immediately before, the instant when the valve is completely open.

The present invention provides in a single compact mechanism a bidirectional overrunning clutch having a release means which may be in the form of an outwardly extending arm or handle. The release means is adapted to selectively override the torque supplied by the driving motor so that a driven member actuated through a clutch in accordance with the present invention may be manually moved to either limit of its travel regardless of whether or not the driving motor is at the moment operating, and regardless of the direction of rotation of the motor. I provide stop means for affording angular limit control of the travel of the driven member, such stop means being disposed to subtend a desired angle at the axis of rotation of the driven member.

It is an object of this invention, therefore, to disclose a novel bidirectional overrunning clutch.

Another object of the invention is to disclose an overrunning clutch including overriding release means.

A further object of the invention is to provide a device of the above character adapted to transmit to the driven member torque at high speed through a predetermined angle and to disconnect the driven member at an accurately located point.

Still another object of the invention is to provide a device of the above class which is extremely rugged in construction and reliable in operation and yet is relatively inexpensive to manufacture and very compact.

These and allied objects of the invention will be understood from a reading of the following description of a preferred embodiment thereof taken in connection with the accompanying drawing in which:

Fig. 1 is a sectional view of an overrunning clutch in accordance with my invention taken on line I—I of Fig. 2 and including a pair of stationary stop pins for limiting the angular travel on the driven member. The parts are assumed to be rotating counter-clockwise.

Fig. 2 is a sectional view taken on line II—II of Fig. 1.

Fig. 3 is a fragmentary sectional view similar to that of Fig. 1 but showing the parts somewhat later than as shown in Fig. 1, the arm of the release means having contacted a stop pin and thereby stopped the movement of the driven member.

Fig. 4 is a fragmentary sectional view similar to Fig. 1 except that the parts are rotating in a clockwise direction.

Fig. 5 is a fragmentary sectional view similar to that of Fig. 4 but showing the parts somewhat later than as shown in Fig. 4, the arm of the release means having contacted a stop pin and thereby stopped the movement of the driven member.

Fig. 6 is a fragmentary sectional view similar to Fig. 5 showing an alternative form of construction of my invention.

Fig. 7 is a fragmentary sectional view, on an enlarged scale, taken on line VII—VII of Fig. 2.

Referring now in detail to the drawing and particularly to Figs. 1 and 2, a driving member indicated generally at 10 includes a hollow shell-like annular member 12 having a smooth cylindrical inner wall 14. Driving member 10 may be mounted for rotation in any desired manner upon a driving shaft or other source of rotational power not shown. A driven member indicated generally at 20 includes an enlarged end portion 22 disposed within the driving shell 12. End portion 22 has, in the illustrative embodiment shown in the drawing, four flattened or planar areas 24, 26, 28, and 30. Each of the planar areas may have in its central portion a longitudinally extending groove 23, 25, 27, and 29, respectively. Driving and driven members 10 and 20 respectively are rotatable about a common axis 18.

Resilient means are provided centrally of each planar area, a preferred means taking the form of spring 32 carried in recess 29. Spring 32 may be formed of a piece of flat metal bent at its center through 180° to provide a pair of outwardly extending, substantially parallel leaves or legs 36 and 37 resiliently urged apart. When the completed clutch is assembled, the springs are retained in position as shown, or it may be desired to fix each spring to the base of its recess 29 as by spot welding 34.

Disposed in the space between the smooth inner wall 14 of the driving member 10 and the flattened or planar area 30 of driven member 20 is a pair of locking elements 40 and 42. The locking elements are circular in cross section and may take the form either of spherical balls or cylindrical rollers. The latter is the construction preferred by me and is shown in the present embodiment of the invention.

From the structure thus far described, it will be noted that rotation of driving member 10 in a counter-clockwise direction will cause the mechanism to transmit torque to the driven member 20. This transmission is caused by reason of the fact that the force of leg 37 of resilient spring 32 biases locking element 42 in a downward direction as viewed in Fig. 1, thus forcing the locking element 42 into wedging engagement between the counterclockwise rotating smooth inner wall 14 and the planar area 30 and effectively locking together the driving and driven members 10 and 20 respectively.

Rotatably carried upon driven member 20 is a release means indicated generally at 50 and including a radially projecting handle or arm 52. Release means 50 includes fingers 54 and 56, the fingers being arcuately shaped in order to lie within and slightly spaced from the cylindrical inner wall 14 of the annular driving member 12. Finger 56 is disposed in a clockwise direction from locking element 40, while finger 54 is disposed in a counterclockwise direction from locking element 42. Finger 54 includes an end face 55 disposed adjacent locking element 42 and finger 56 includes an end face 57 disposed adjacent locking element 40. Release means 50 is carried upon driven member 20 and may be rotated through a small angle relative thereto on bearing contact 51 with the driven member.

Additional resilient means, locking elements and release fingers are shown in Fig. 1 disposed about the circumference of driven member 20, including locking element 44 and resilient leg 46 appearing in Fig. 2. The functioning of all these additional parts is identical to that of locking elements 40 and 42 and their associated parts, and will therefore not be set forth in detail. The number of flattened or planar areas on driven member 20, each with identical torque-transmitting parts, may range from one to as many as may be desired, the four shown herein being understood to be exemplary only.

In Fig. 3 is shown the mechanism heretofore described after a portion of a revolution in a counterclockwise direction from the position shown in Fig. 1. A stop member 60 is fixed relative to the common axis 18 of driving member 10 and driven member 20, and is arranged to be contacted by the radially projecting arm 52 of release means 50. At the instant of contact the end face 55 of release finger 54 dislodges locking element 42 from its wedging engagement between the cylindrical inner wall 14 and the flattened area 30, and thus disengages the driving member 10 from the driven member 20. In this manner the driving member 10 may continue its counterclockwise rotation but no torque is transmitted to the driven member 20.

From the preceding description of the operation of the clutch when counterclockwise torque is being transmitted, its operation during clockwise rotation, shown in Figs. 4 and 5, will be readily understood. It will be seen that the locking elements, resilient legs and release fingers heretofore described are symmetrically disposed relative to a plane extending radially of driven member 20 and bisecting the groove or recess 29 in the driven member 20. Thus in Fig. 4 when driving member 10 is rotated in a clockwise direction locking element 40, being biased clockwise by the force of leg 36 of resilient means 32, will move into wedging engagement between the cylindrical inner wall 14 of the driving member 10 and the planar area 30 of the driven member 20. Such wedging engagement continues until the radially projecting arm 52 of the release means 50 is caused to strike a second stop pin 62 as appears in Fig. 5. Stop pin 62, similarly to stop pin 60 previously described, is fixed relative to the common axis 18 of the driving and driven members and it will be seen by reference to Fig. 5 that at the instant of contact of arm 52 with stop pin 62, locking element 40 is dislodged from its wedging engagement previously described, whereupon driving member 10 may continue its clockwise rotation without transmitting torque to the driven member 20.

It is to be noted that the two stop pins 60 and 62 may be disposed so that they subtend at the common axis 18 any desired angle. The angle through which the driven member 20 is caused to rotate can be pre-determined with extreme accuracy by suitable location of the stop pins 60 and 62. Although the release means 50 is rotatably carried upon the driven member 20 through bearing surface 51 as previously described, the actual relative movement between the release means and the driven member is extremely small, the illustrations herewith having been somewhat exaggerated in showing the movement of the parts in the interest of clarity of explanation.

Rotational movement of arm 52 by suitable means, for instance manually, will always cause rotation of the driven member 20 regardless of the movement or lack of movement of the driving member 10. Thus, with reference to Fig. 3, it will be seen that when arm or handle 52 is moved clockwise as viewed in said figure, clockwise torque will be transmitted through release finger 54, locking element 42, resilient legs 37 and 26, and locking element 40 to planar area 30 of the driven member. Even though driving member 10 and locking element 40 are rotating counterclockwise, the torque manually applied to handle 52 will be transmitted as just described. For some applications I may provide means for positively restricting relative rotation between driven member 20 and release means 50. Such means, as shown in Figs. 2 and 7, include radially projecting pin 21 fixed to driven member 20 and a corresponding recess 53 formed in release means 50. It will be seen in Fig. 7 that recess 53 is slightly larger than pin 21 so that a small amount of angular movement is afforded to the release means relative to the driven member.

It was previously mentioned that a typical application of the present invention is in a power actuated mechanism, including a driving motor, for opening and closing a valve in a fluid line. In the event of power failure or malfunctioning of the driving motor the valve would have to be manually actuated and the mechanism of the present invention affords means for such actuation. It is important that manual operation always override the motion which the driving motor is seeking to impose upon the driven member, and this is inherently the case with the present clutch.

In Fig. 6 is shown a modified form of construction for practicing the present invention wherein the component parts are identified by reference numerals one hundred greater than their corresponding counterparts previously described in connection with Figs. 1 to 5 inclusive. In the construction of Fig. 6 driven member 120 includes a flattened or planar area 130 having no central recess or groove formed therein. Centrally disposed on the planar area 130 is resilient means 132 which as before may be fixed to planar area 130 by any suitable means such as weld 134. Resilient arms 136 and 137, locking elements 140 and 142 and release means 150 having release fingers 154 and 156 all operate in the manner heretofore described, with arm or handle 152 striking stop pin 162 during clockwise rotation of driving member 110 thus disengaging the driven member from the driving member.

It will be readily understood that the outwardly facing area 30 or 130 need not necessarily be planar as heretofore described in connection with the preferred embodiments illustrated. Such areas serve as locking surfaces and must be in convergent relation with the smooth inner cylindrical surface of the driving member 12, but they may be concave or even convex so long as they are capable of receiving the locking elements in wedging engagement between themselves and the cylindrical surface. In the interests of ease and economy of manufacture I prefer the locking surfaces to be planar, but it is recognized that for certain purposes and in certain applications non-planar locking surfaces may be desirable, and such surfaces are within the contemplation of the present invention.

Moreover the outwardly facing surfaces of the driven member other than the locking surfaces do not contribute to successful operation except from the standpoint of the strength of the apparatus. Hence the portions of the driven member intermediate successive locking surfaces may be eliminated in the interest of economy of weight provided always that sufficient material remains to safely transmit the torque which the clutch may be called upon to convey in a given application.

It is to be noted that the accompanying illustrations have been exaggerated in order to better depict the mode of operation of the present invention. In practice the locking elements 40 and 42 remain in contact with the planar area 30 of the driven member at all times under the influence of resilient means 32, and the angular movement of release or disconnect means 50 relative to the driven member is very much smaller than that shown. As a result, there is virtually no back-lash or lost motion whatsoever in the operation of the clutch.

Accordingly I have provided a bidirectional overrunning clutch which is rugged and compact in construction and reliable in functioning. Modifications and changes from the specific forms herein shown and described will readily occur to those skilled in the art. All such modifications and changes within the spirit of the invention are intended to be embraced by the following claims.

I claim:

1. A bidirectional overrunning clutch comprising coaxial, rotatable driving and driven members, the driving member including a hollow annular shell having a smooth inner cylindrical surface and the driven member being disposed within said shell and having an outwardly facing longitudinally extending locking surface in convergent relation with said inner cylindrical surface; a pair of locking elements of circular cross-section disposed on said locking surface; resilient means carried by the driven member and disposed centrally of the locking surface, said means biasing the pair of locking elements apart; release means rotatably mounted on the driven member and disposed within said shell, said release means being selectively rotatable to move one of said locking elements against the force of said resilient means; means positively limiting rotation of said release means relative to the driven member; and handle means fixed to said release means, whereby at all times manual actuation of the handle means causes rotation of the driven member independent of motion of the driving member.

2. Apparatus as stated in claim 1 wherein said locking surface is planar.

3. Apparatus as stated in claim 1 wherein said locking elements are cylindrical having axes parallel to the common axis of the driving and driven members.

4. A bidirectional overrunning clutch comprising coaxial, rotatable driving and driven members, the driving member including a hollow annular shell having a smooth inner cylindrical surface and the driven member being disposed within said shell and having a plurality of arcuately spaced, outwardly facing locking surfaces in convergent relation with said smooth inner cylindrical surface; a plurality of pairs of locking elements between said locking surfaces and said cylindrical surface, said locking elements being circular in cross-section; resilient means disposed centrally of each of said locking surfaces urging the locking elements into wedging engagement between the locking surfaces and the cylindrical surface; release means rotatably carried on the driven member and including a plurality of release fingers within said shell and angularly spaced from the locking elements; means positively limiting rotation of said release means relative to said driven member; and outwardly extending handle means fixed to said release means.

5. Apparatus as stated in claim 4 wherein said handle extends radially of the axis of the driven member and including a pair of angularly spaced stop means fixed relative to said axis arranged to be contacted by said handle and defining the limits of travel thereof.

6. Apparatus as stated in claim 4 wherein said locking elements are cylindrical and have axes extending parallel to the common axis of the driving and driven members.

References Cited in the file of this patent

UNITED STATES PATENTS

| Number | Name | Date |
|---|---|---|
| 1,985,127 | Wemp | Dec. 18, 1934 |
| 2,066,167 | Swartz | Dec. 29, 1936 |
| 2,299,739 | Colucci | Oct. 27, 1942 |
| 2,469,572 | Pratt | May 10, 1949 |